(12) United States Patent
Warneke et al.

(10) Patent No.: US 11,892,176 B2
(45) Date of Patent: Feb. 6, 2024

(54) UNIVERSAL MEMBRANE CONFIGURED TO BE DIVIDED TO FORM A BASE MEMBRANE AND A COVER MEMBRANE THAT IS COUPLABLE TO THE BASE MEMBRANE TO FORM AN UNCOUPLING MEMBRANE FOR INSTALLATION BETWEEN A SUBFLOOR AND FLOOR TILES

(71) Applicant: MP Global Products, L.L.C., Norfolk, NE (US)

(72) Inventors: Chase Warneke, Pierce, NE (US); Alan B. Collison, Pierce, NE (US); Reid Borgman, Norfolk, NE (US)

(73) Assignee: MP Global Products, L.L.C., Norfolk, NE (US)

( * ) Notice: Subject to any disclaimer, the term of this patent is extended or adjusted under 35 U.S.C. 154(b) by 0 days.

(21) Appl. No.: 17/874,029

(22) Filed: Jul. 26, 2022

(65) Prior Publication Data
US 2023/0072576 A1    Mar. 9, 2023

Related U.S. Application Data

(63) Continuation-in-part of application No. 17/365,180, filed on Jul. 1, 2021, now Pat. No. 11,448,405, which
(Continued)

(51) Int. Cl.
*F24D 3/14* (2006.01)
*E04F 15/18* (2006.01)
(Continued)

(52) U.S. Cl.
CPC ............ *F24D 3/142* (2013.01); *E04F 15/182* (2013.01); *E04F 15/185* (2013.01); *F24D 3/141* (2013.01);
(Continued)

(58) Field of Classification Search
CPC ........ F24D 13/024; F24D 13/02; F24D 3/144; F24D 3/141; F24D 3/12; F24D 19/0213;
(Continued)

(56) References Cited

U.S. PATENT DOCUMENTS 2,956,785 A    10/1960    Riehl
3,419,457 A    12/1968    Harold
(Continued)

FOREIGN PATENT DOCUMENTS

DE    1986165 U    5/1968
DE    3317131 A1    11/1984
(Continued)

OTHER PUBLICATIONS

"DE_202006013453_U1_H—Machine Translation.pdf", machine translation, EPO.org, Mar. 28, 2020. (Year: 2020).*
(Continued)

*Primary Examiner* — Steven B McAllister
*Assistant Examiner* — Daniel E. Namay
(74) *Attorney, Agent, or Firm* — Harness, Dickey & Pierce, P.L.C.

(57) ABSTRACT

A universal membrane is configured to be installed between a subfloor and floor tiles to allow movement of the floor tiles relative to the subfloor. The universal membrane includes a base layer, a plurality of studs projecting from the base layer, and a plurality of sidewalls projecting from the base layer and disposed between adjacent ones of the plurality of studs. Each sidewall of the plurality of sidewalls forming a perimeter of a pocket. The base layer forms a bottom wall of the pocket.

17 Claims, 14 Drawing Sheets

Related U.S. Application Data is a continuation of application No. 17/093,610, filed on Nov. 9, 2020, now Pat. No. 11,054,147, which is a continuation of application No. 16/885,782, filed on May 28, 2020, now Pat. No. 10,928,075.

(51) Int. Cl.
  *F28D 7/08* (2006.01)
  *H05B 3/28* (2006.01)
  *F24D 3/12* (2006.01)

(52) U.S. Cl.
  CPC ............ *F24D 3/144* (2013.01); *F28D 7/082* (2013.01); *F28D 7/087* (2013.01); *F24D 3/12* (2013.01); *F28D 7/08* (2013.01); *H05B 3/28* (2013.01)

(58) Field of Classification Search
  CPC . F24D 3/142; Y02B 30/26; E04B 5/48; E04B 1/12; E04B 1/168; E04B 1/28; E04B 1/34331; E04B 5/023; E04B 5/43; H05B 3/28; E04F 15/18; E04F 15/182; E04F 15/185; E04F 15/02044; F28D 7/08; F28D 7/082; F28D 7/087
  USPC ......... 237/69, 59, 56, 8 A; 52/220; 138/177; 165/49, 50, 47, 48.1, 53, 56, 70; 219/213; 423/31
  IPC .......... F24D 3/16,3/14, 3/12, 3/02; E04B 5/48, 1/12, 1/16, 1/28, 5/02, 5/43
  See application file for complete search history.

(56) References Cited

U.S. PATENT DOCUMENTS

| | | |
|---|---|---|
| 3,495,367 A | 2/1970 | Kobayashi |
| 3,597,891 A | 8/1971 | Martin |
| 3,757,481 A | 9/1973 | Skinner |
| 4,326,366 A | 4/1982 | Werner |
| 4,990,744 A | 2/1991 | Willner |
| 5,042,569 A | 8/1991 | Siegmund |
| 5,082,712 A | 1/1992 | Starp |
| 5,597,033 A | 1/1997 | Cali |
| 5,775,839 A | 7/1998 | Mazzer |
| 5,862,854 A | 1/1999 | Gary |
| 6,094,878 A | 8/2000 | Schluter |
| 6,167,668 B1 | 1/2001 | Fine et al. |
| 6,220,523 B1 | 4/2001 | Fiedrich |
| 6,283,382 B1 | 9/2001 | Fitzemeyer |
| 6,434,901 B1 | 8/2002 | Schluter |
| D541,396 S | 4/2007 | Fawcett et al. |
| D587,358 S | 2/2009 | Stephan et al. |
| 7,536,835 B2 | 5/2009 | Schluter |
| 7,992,623 B2 | 8/2011 | Keller |
| 8,002,241 B1 | 8/2011 | Shaw |
| 8,025,240 B2 | 9/2011 | Keller |
| 8,176,694 B2 | 5/2012 | Batori |
| 8,203,099 B2 | 6/2012 | Peters et al. |
| 8,950,141 B2 | 2/2015 | Schluter et al. |
| 8,955,278 B1 | 2/2015 | Mills |
| 9,016,018 B2 | 4/2015 | Boyle |
| 9,188,348 B2 | 11/2015 | Larson |
| 9,416,979 B2 | 8/2016 | Larson |
| 9,428,920 B2 | 8/2016 | Schluter et al. |
| D773,697 S | 12/2016 | Amend |
| 9,518,396 B2 | 12/2016 | Boyle |
| 9,518,746 B2 | 12/2016 | Larson |
| 9,625,163 B2 | 4/2017 | Larson |
| 9,719,265 B2 | 8/2017 | Bordin et al. |
| 9,726,383 B1 | 8/2017 | Bordin |
| 9,777,931 B2 | 10/2017 | Larson |
| 9,797,146 B2 | 10/2017 | Schluter et al. |
| D806,912 S | 1/2018 | Bordin |
| 9,869,100 B2 | 1/2018 | Sennik |
| 9,890,959 B2 | 2/2018 | Houle et al. |
| 9,957,724 B2 | 5/2018 | Boyle |
| 10,006,644 B2 | 6/2018 | Larson |
| D830,584 S * | 10/2018 | Comitale ..................... D25/138 |
| 10,107,505 B2 | 10/2018 | Larson |
| 10,190,324 B2 * | 1/2019 | Julton ............... E04F 15/02044 |
| 10,215,423 B2 | 2/2019 | Bordin et al. |
| 10,392,814 B2 | 8/2019 | Schluter et al. |
| 10,408,469 B2 | 9/2019 | Larson |
| 10,502,434 B2 | 12/2019 | Bordin |
| 10,590,661 B2 | 3/2020 | Pucilowski |
| 10,597,879 B2 | 3/2020 | Boyle |
| 10,626,623 B2 | 4/2020 | Cais et al. |
| 10,712,020 B2 | 7/2020 | Larson |
| 10,739,016 B2 | 8/2020 | Larson |
| 10,822,812 B2 | 11/2020 | Schluter et al. |
| 10,859,274 B2 | 12/2020 | Bordin |
| 10,900,241 B2 | 1/2021 | Schluter |
| 10,928,075 B1 | 2/2021 | Warneke et al. |
| 10,968,541 B2 | 4/2021 | Blankenhorn et al. |
| 11,041,638 B2 | 6/2021 | Larson |
| 11,054,147 B1 | 7/2021 | Warneke et al. |
| 11,168,476 B1 | 11/2021 | Tadros et al. |
| 2006/0086717 A1 * | 4/2006 | Oosterling ............ F24D 13/022 219/528 |
| 2007/0056233 A1 | 3/2007 | Kang et al. |
| 2008/0017725 A1 | 1/2008 | Backman |
| 2008/0276557 A1 | 11/2008 | Rapaz |
| 2008/0290503 A1 | 11/2008 | Karavakis et al. |
| 2008/0290504 A1 | 11/2008 | Karavakis et al. |
| 2009/0026192 A1 | 1/2009 | Fuhrman |
| 2009/0217605 A1 | 9/2009 | Batori |
| 2009/0230113 A1 | 9/2009 | Batori |
| 2011/0047907 A1 | 3/2011 | Smolka et al. |
| 2014/0069039 A1 | 3/2014 | Schluter et al. |
| 2016/0010327 A1 | 1/2016 | Larson |
| 2016/0047131 A1 | 2/2016 | Larson |
| 2016/0192443 A1 | 6/2016 | Schluter |
| 2016/0273232 A1 | 9/2016 | Bordin et al. |
| 2017/0362841 A1 * | 12/2017 | Comitale ............... E04F 15/225 |
| 2018/0223543 A1 | 8/2018 | Faotto |
| 2018/0299140 A1 | 10/2018 | Larson |
| 2019/0100925 A1 | 4/2019 | Pucilowski |
| 2019/0226686 A1 | 7/2019 | White et al. |
| 2020/0340685 A1 | 10/2020 | Larson |
| 2021/0088225 A1 | 3/2021 | Bordin |
| 2021/0172614 A1 | 6/2021 | Larson |

FOREIGN PATENT DOCUMENTS

| | | | | |
|---|---|---|---|---|
| DE | 3730144 A1 * | 9/1986 | ......... | B29C 37/0082 |
| DE | 3543688 A1 | 1/1987 | | |
| DE | 9114591 U1 | 3/1993 | | |
| DE | 29507927 U1 * | 5/1995 | ............ | E04F 15/185 |
| DE | 29609497 U1 | 8/1996 | | |
| DE | 19750277 A1 * | 5/1999 | ............ | E04D 11/005 |
| DE | 19936801 C1 | 8/2000 | | |
| DE | 19912922 C1 * | 1/2001 | ............. | F24D 3/141 |
| DE | 10040643 C1 | 11/2001 | | |
| DE | 202006013453 U1 * | 12/2006 | ............. | F24D 3/142 |
| DE | 102006004626 A1 | 8/2007 | | |
| DE | 102006004755 A1 | 8/2007 | | |
| DE | 102006035135 A1 | 1/2008 | | |
| EP | 133556 A2 | 2/1985 | | |
| EP | 367176 A2 | 5/1990 | | |
| EP | 368804 A1 | 5/1990 | | |
| EP | 0357921 B1 | 7/1991 | | |
| EP | 0637720 A1 | 2/1995 | | |
| EP | 0947778 A2 * | 3/1999 | ............. | F24D 3/141 |
| EP | 1338413 A1 | 8/2003 | | |
| EP | 1054217 B1 * | 10/2005 | ............. | F24D 3/142 |
| EP | 2466029 A1 * | 6/2012 | ............... | E04B 5/48 |
| EP | 1770337 B1 | 7/2014 | | |
| EP | 3225893 A1 | 10/2017 | | |
| JP | H01139935 U * | 11/1987 | ............. | C08J 7/047 |
| JP | H01139935 A | 6/1989 | | |
| JP | 2001012067 A | 1/2001 | | |
| WO | WO-8203099 A1 | 9/1982 | | |
| WO | WO-2004111544 A1 | 12/2004 | | |

(56) References Cited

FOREIGN PATENT DOCUMENTS

| WO | WO-2008098413 A1 | * | 8/2008 | ........ E04F 15/02447 |
| WO | WO-2016036365 A1 | * | 3/2016 | ............. F24D 13/02 |
| WO | WO-2019228734 A1 | | 12/2019 | |

OTHER PUBLICATIONS

"EP_0637720_A1_M—Machine Translation.pdf", machine translation, EPO.org, Mar. 28, 2020. (Year: 2020).*
Definition—Detent—Dictionary.com 2022-01-13.pdf, http://www.dictionary.com, Jan. 13, 2022. (Year: 2022).
International Search Report and Written Opinion corresponding to International Application No. PCT/US2021/034575 dated Sep. 10, 2021, 11 pages.
Schluter DITRA-HEAT Electric floor warming system with integrated uncoupling technology pamphlet, Mar. 2020, Schluter Systems L.P. and affiliates, 10 pages.

* cited by examiner

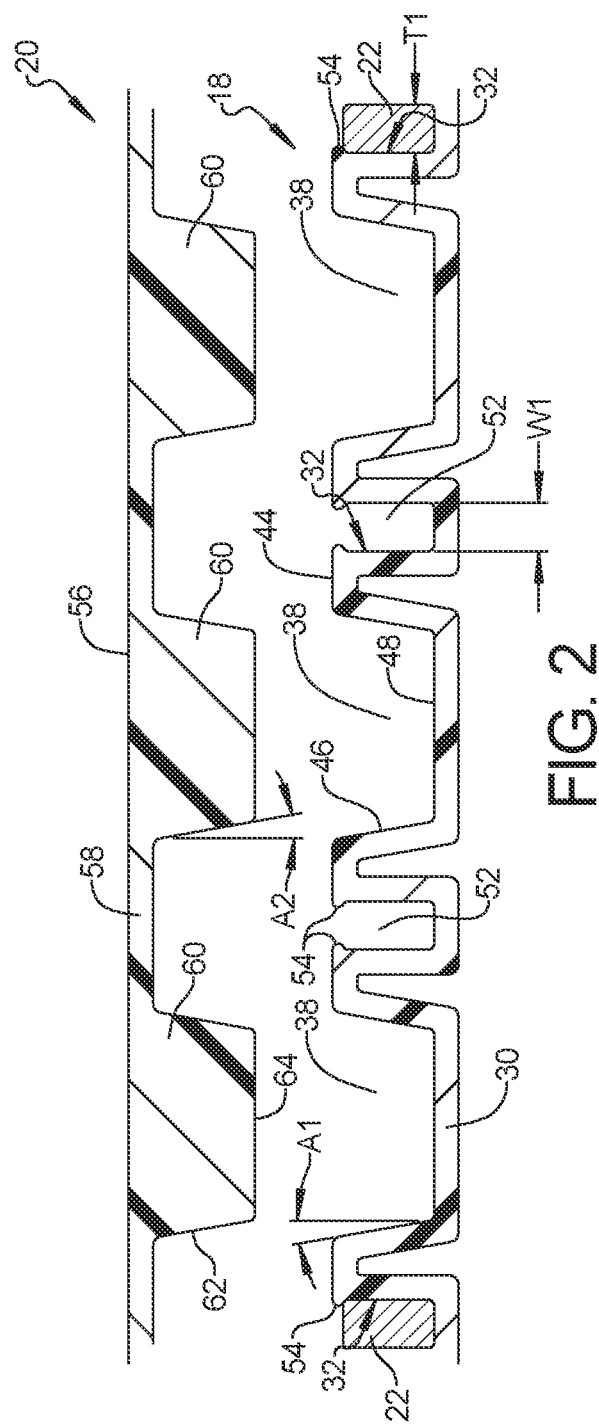
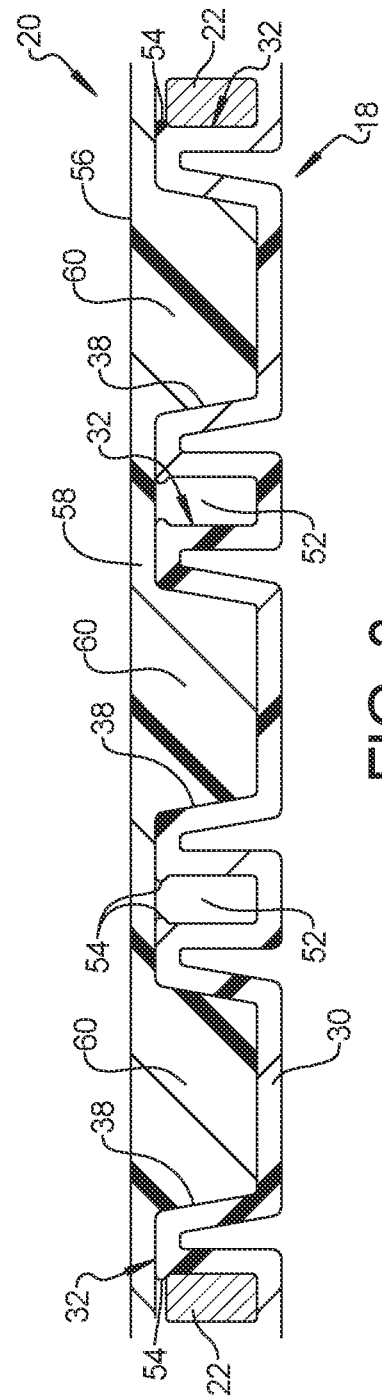

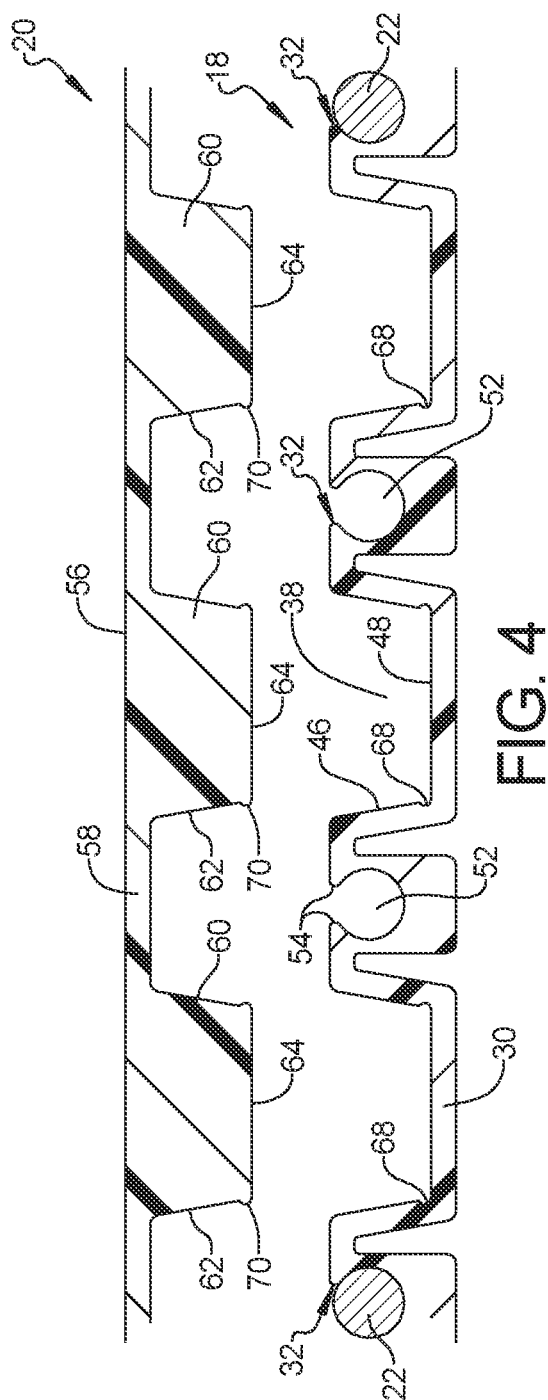
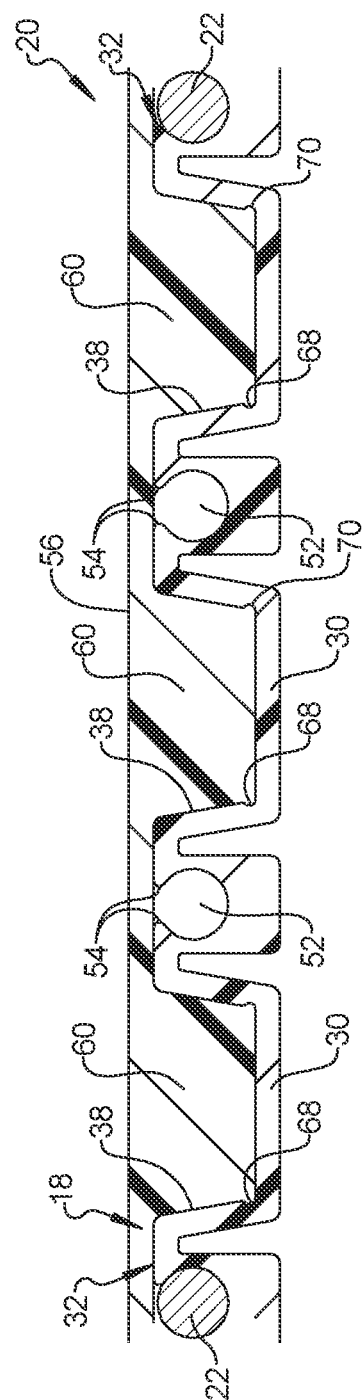

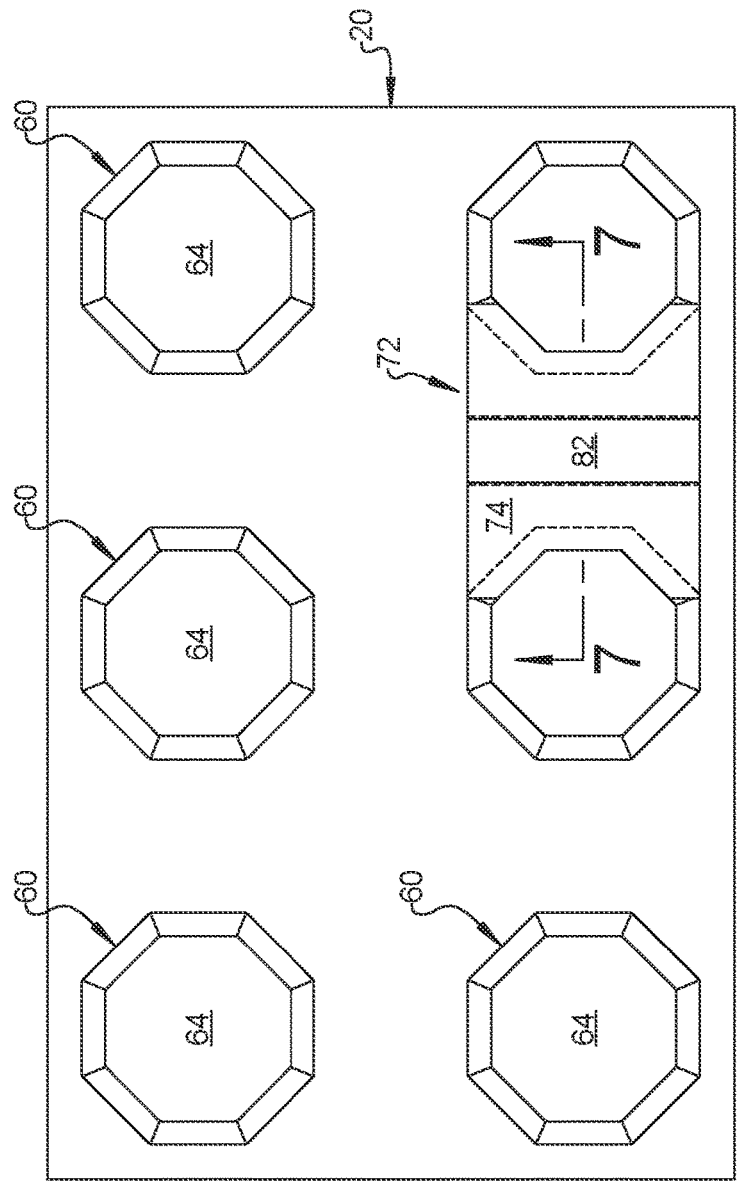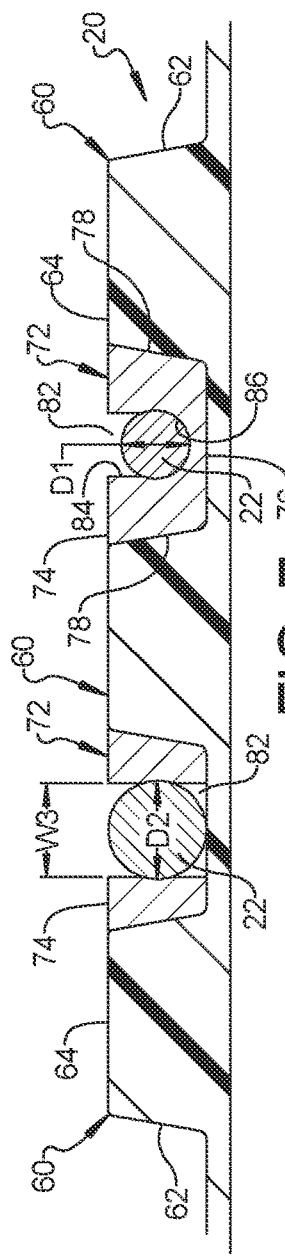

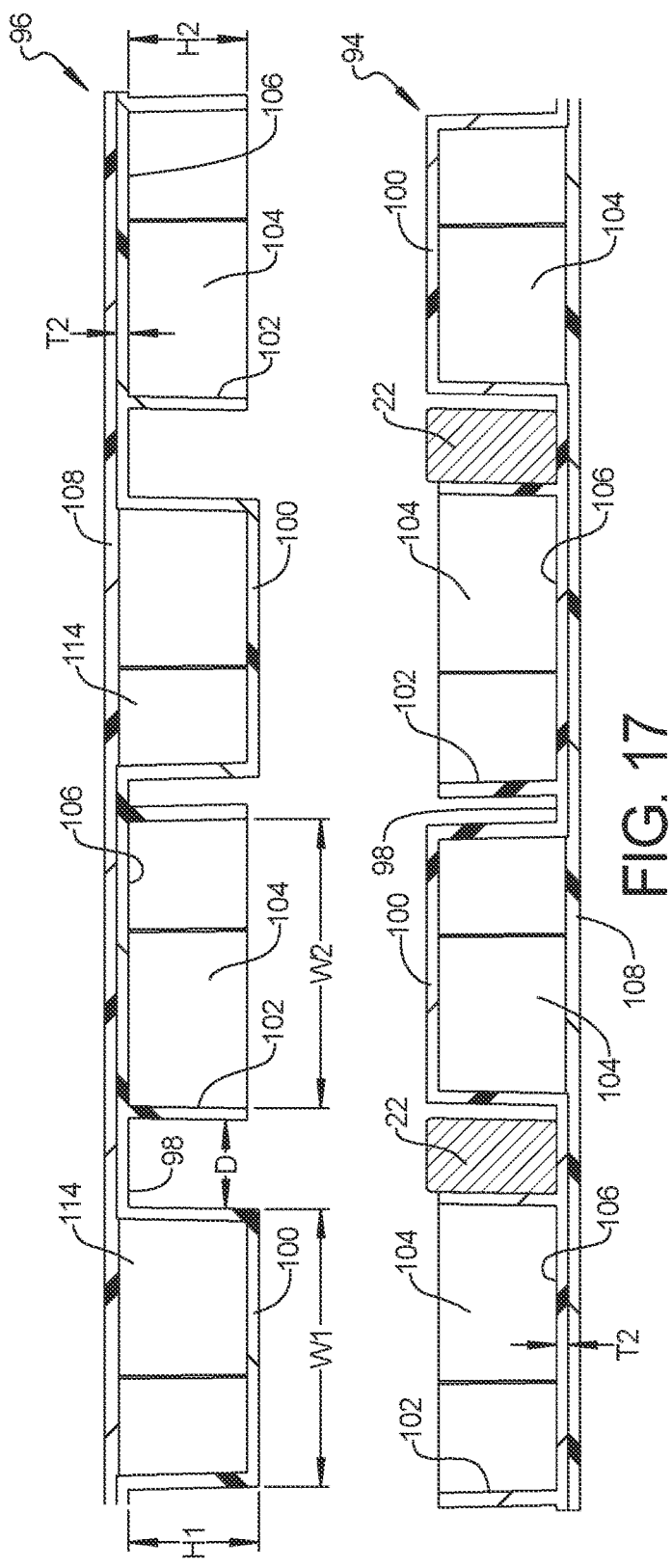
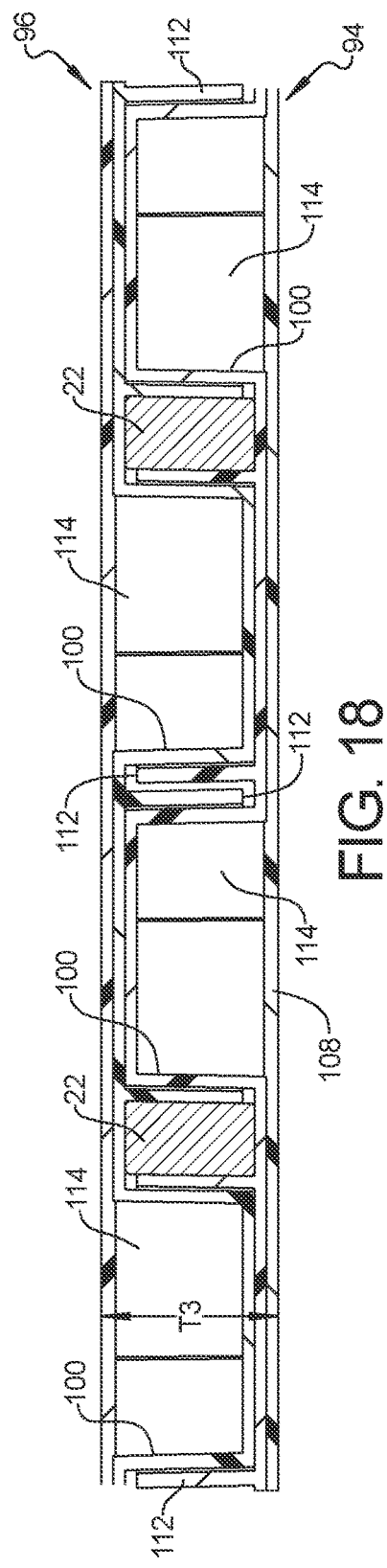
FIG. 17
FIG. 18

UNIVERSAL MEMBRANE CONFIGURED TO BE DIVIDED TO FORM A BASE MEMBRANE AND A COVER MEMBRANE THAT IS COUPLABLE TO THE BASE MEMBRANE TO FORM AN UNCOUPLING MEMBRANE FOR INSTALLATION BETWEEN A SUBFLOOR AND FLOOR TILES

CROSS-REFERENCE TO RELATED APPLICATIONS

The present disclosure is a continuation-in-part of U.S. patent application Ser. No. 17/365,180, filed on Jul. 1, 2021, which is a continuation of U.S. patent application Ser. No. 17/093,610 (now U.S. Pat. No. 11,054,147), filed on Nov. 9, 2020, which is a continuation of U.S. patent application Ser. No. 16/885,782 (now U.S. Pat. No. 10,928,075), filed on May 28, 2020. The entire disclosures of the applications referenced above are incorporated herein by reference.

FIELD

The present disclosure relates to universal membranes configured to be divided to form a base membrane and a cover membrane that is couplable to the base membrane to form an uncoupling membrane for installation between a subfloor and floor tiles.

BACKGROUND

This section provides background information related to the present disclosure which is not necessarily prior art.

Floor heating systems are placed between a subfloor and a floor covering, such as a tile floor, to heat the floor covering to a desired temperature. Floor heating systems typically include a heating cable and an uncoupling membrane. The heating cable generates heat when electrical current is passed through the heating cable. The uncoupling membrane holds the heating cable in a desired routing pattern as the floor covering is installed over the heating cable. In addition, the uncoupling membrane uncouples the floor covering and the subfloor from one another to allow the floor covering and the subfloor to move in a horizontal plane relative to one another.

SUMMARY

The present disclosure describes a universal membrane configured to be installed between a subfloor and floor tiles to allow movement of the floor tiles relative to the subfloor. In one example, the universal membrane includes a base layer, a plurality of studs projecting from the base layer, and a plurality of sidewalls projecting from the base layer and disposed between adjacent ones of the plurality of studs. Each sidewall of the plurality of sidewalls forming a perimeter of a pocket. The base layer forming a bottom wall of the pocket.

In one aspect, each stud of the plurality of studs is configured to fit within the pocket defined by one of the plurality of sidewalls and the base layer.

In one aspect, each stud of the plurality of studs has a perimeter with the same shape as the perimeter of formed by each sidewall of the plurality of sidewalls.

In one aspect, the perimeter formed by each sidewall of the plurality of sidewalls is in the shape of a pentagon.

In one aspect, the plurality of studs are aligned in a first set of rows, the plurality of sidewalls are arranged in a second set of rows, and the first and second sets of rows are arranged in an alternating pattern with rows of the first set disposed between rows of the second set, and rows of the second set disposed between rows of the first set.

In one aspect, a first portion of the universal membrane is configured to be separated from a second portion of the universal membrane, and the first and second portions of the universal membrane are configured to be coupled to one another by inserting the plurality of studs on one of the first and second portions of the universal membrane into the pockets formed by the plurality of sidewalls on the other one of the first and second portions of the universal membrane.

In one aspect, the base layer is configured to be cut to separate the first portion of the universal membrane from the second portion of the universal membrane.

In one aspect, one of the plurality of sidewalls on the first portion of the universal membrane and one of the plurality of sidewalls on the second portion of the universal membrane are configured to hold a heating cable therebetween.

The present disclosure also describes a floor structure including the universal membrane, the subfloor, and the floor tiles. The first portion of the universal membrane forms a base membrane configured to be placed on the subfloor, and the second portion of the universal membrane forms a cover membrane configured to cover the base membrane to prevent tile adhesive from reaching the base membrane and to form a flat surface for supporting the floor tiles.

The present disclosure also describes a floor structure including a subfloor, floor tiles, a base membrane configured to be placed onto the subfloor, and a cover membrane configured to be coupled to the base membrane to form a support surface for supporting the floor tiles. The base and cover membranes collectively form an uncoupling membrane configured to allow movement of the floor tiles relative to the subfloor. The floor structure is free of any heating element.

In one aspect, the base membrane includes a base layer and a plurality of protrusions projecting from the base layer and defining a plurality of pockets therein, and the cover membrane includes a cover layer and a plurality of studs projecting from the cover layer. The plurality of studs on the cover membrane are configured to fit within the plurality of pockets in the base membrane to couple the cover membrane to the base membrane.

In one aspect, the base membrane further includes a plurality of studs projecting from the base layer, and the cover membrane further includes a plurality of protrusions projecting from the cover layer and defining a plurality of pockets therein. The plurality of studs on the base membrane are configured to fit within the plurality of pockets in the cover membrane to couple the cover membrane to the base membrane.

In one aspect, the plurality of protrusions of the base membrane form sidewalls of the plurality of pockets, and the base layer of the base membrane forms bottom walls of the plurality of pockets.

In one aspect, the base and cover membranes are made of a material having the flexibility of rubber.

The present disclosure also describes a method of installing a floor structure. The method includes separating a universal membrane into a base membrane and a cover membrane. Each of the base and cover membranes including a base layer, a plurality of studs projecting from the base layer, and a plurality of sidewalls projecting from the base layer and disposed between adjacent ones of the plurality of studs. The plurality of sidewalls defining a plurality of pockets with each sidewall of the plurality of sidewalls forming a perimeter of one of the plurality of pockets. The method further includes placing the base membrane onto a subfloor, coupling the cover membrane to the base membrane by inserting the plurality of studs on the cover membrane into the plurality of pockets in the base membrane and inserting the plurality of studs on the base membrane into the plurality of pockets in the cover membrane, and installing floor tiles on the cover membrane.

In one aspect, separating the universal membrane into the base and cover membranes includes cutting the universal membrane.

In one aspect, the method further includes positioning a heating cable between one sidewall of the plurality of sidewalls on the base membrane and one sidewall of the plurality of sidewalls on the cover membrane such that the heating cable is held between the two sidewalls.

In one aspect, positioning the heating cable between the two sidewalls includes placing the heating cable onto the base layer of the base membrane between the one sidewall of the base membrane and one of the plurality of studs on the base membrane adjacent to the one sidewall of the base membrane, and placing the cover membrane onto the base membrane such that the pocket defined by the one sidewall of the cover membrane receives the adjacent stud on the base membrane.

In one aspect, the method further includes applying a first layer of tile adhesive between the subfloor and the base membrane, and applying a second layer of tile adhesive between the cover membrane and the floor tiles.

The present disclosure also describes a method of replacing the floor tiles after installing the floor structure as described above. The method of replacing the floor tiles includes pulling up on the cover membrane by hand to remove the cover membrane and the floor tiles, reinstalling the cover membrane or installing a new one of the cover membrane, and installing new ones of the floor tiles.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 2 is a section view of the heating cable positioned within the base membrane while the cover membrane is disassembled from the base membrane;

FIG. 3 is a section view of the heating cable positioned within the base membrane while the cover membrane is assembled to the base membrane to encapsulate the heating cable;

FIG. 4 is a section view a heating cable having a circular cross-section positioned within the base membrane while the cover membrane is disassembled from the base membrane;

FIG. 5 is a section view of the heating cable of FIG. 4 positioned within the base membrane while the cover membrane is disassembled from the base membrane;

FIG. 6 is a planar view of the cover membrane with a conversion clip installed between studs on the cover membrane, and the heating cable of FIG. 4 positioned within the conversion clip;

FIG. 7 is a section view of the floor heating system taken along a line 7-7 shown in FIG. 6, the section view illustrating two embodiments of the conversion clip;

FIG. 17 is a section view of the universal membrane of FIG. 15 divided to form a base membrane and a cover membrane with a heating cable positioned within the base membrane and the cover membrane disassembled from the base membrane; and FIG. 18 is a section view similar to that shown in FIG. 17 except that the cover membrane is assembled to the base membrane to encapsulate the heating cable.

In the drawings, reference numbers may be reused to identify similar and/or identical elements.

DETAILED DESCRIPTION

Figure 1:
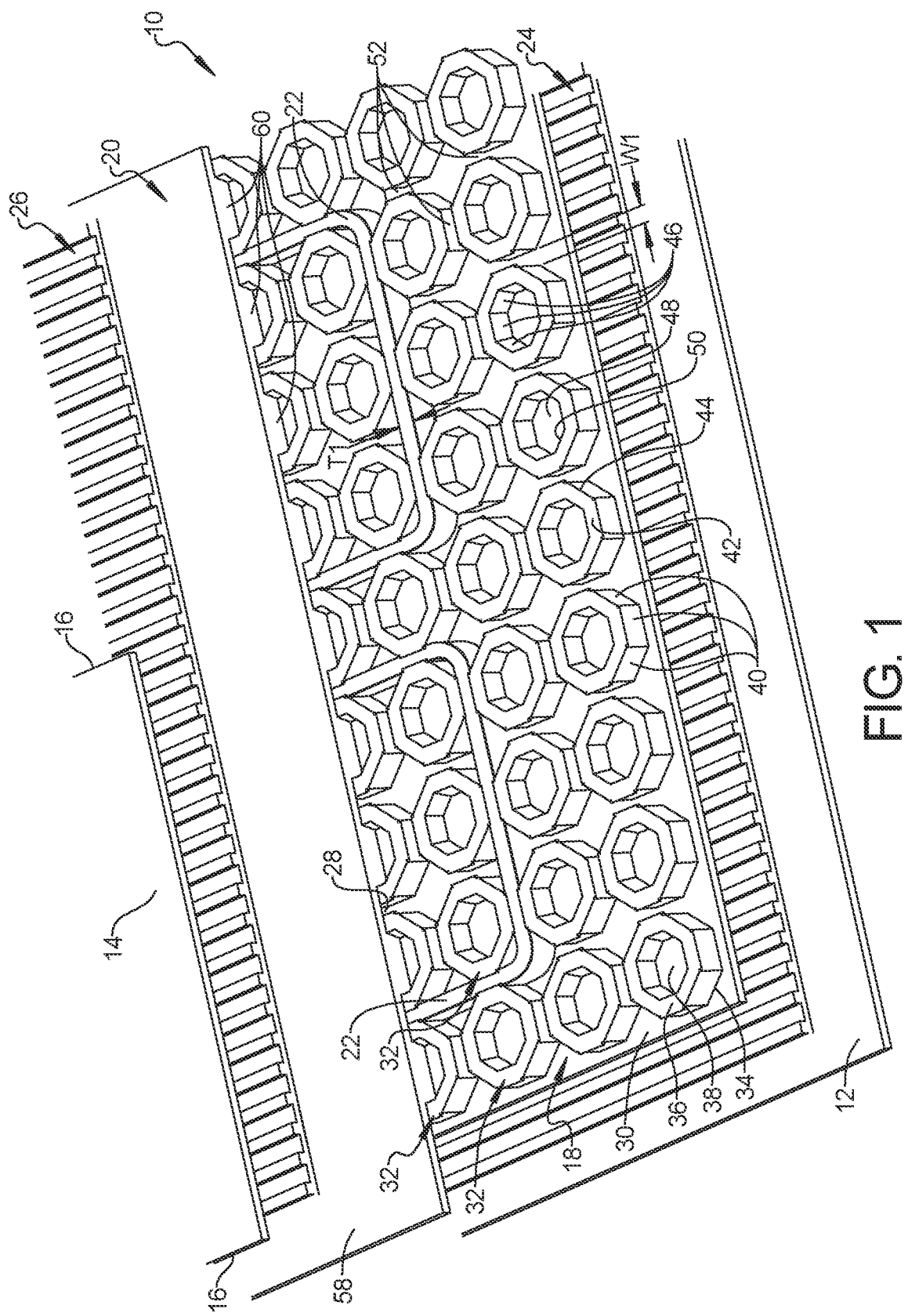
FIG. 1 is a sectioned perspective view of a floor heating system according to the principles of the present disclosure, the floor heating system including a base membrane and a cover membrane encapsulating a heating cable having a rectangular cross-section.
Figure 8:
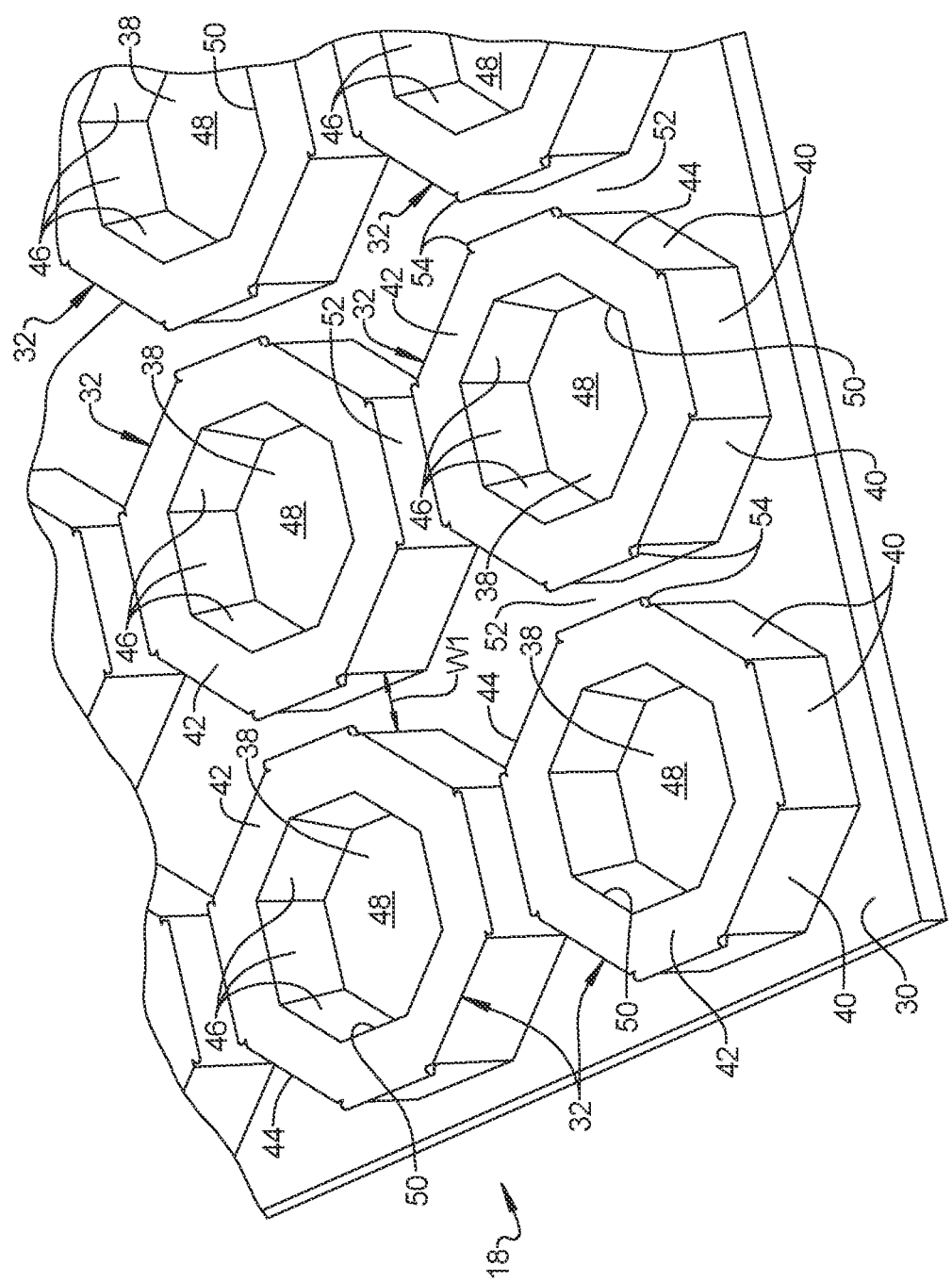
FIG. 8 is a perspective view of the base membrane.
Figure 9:
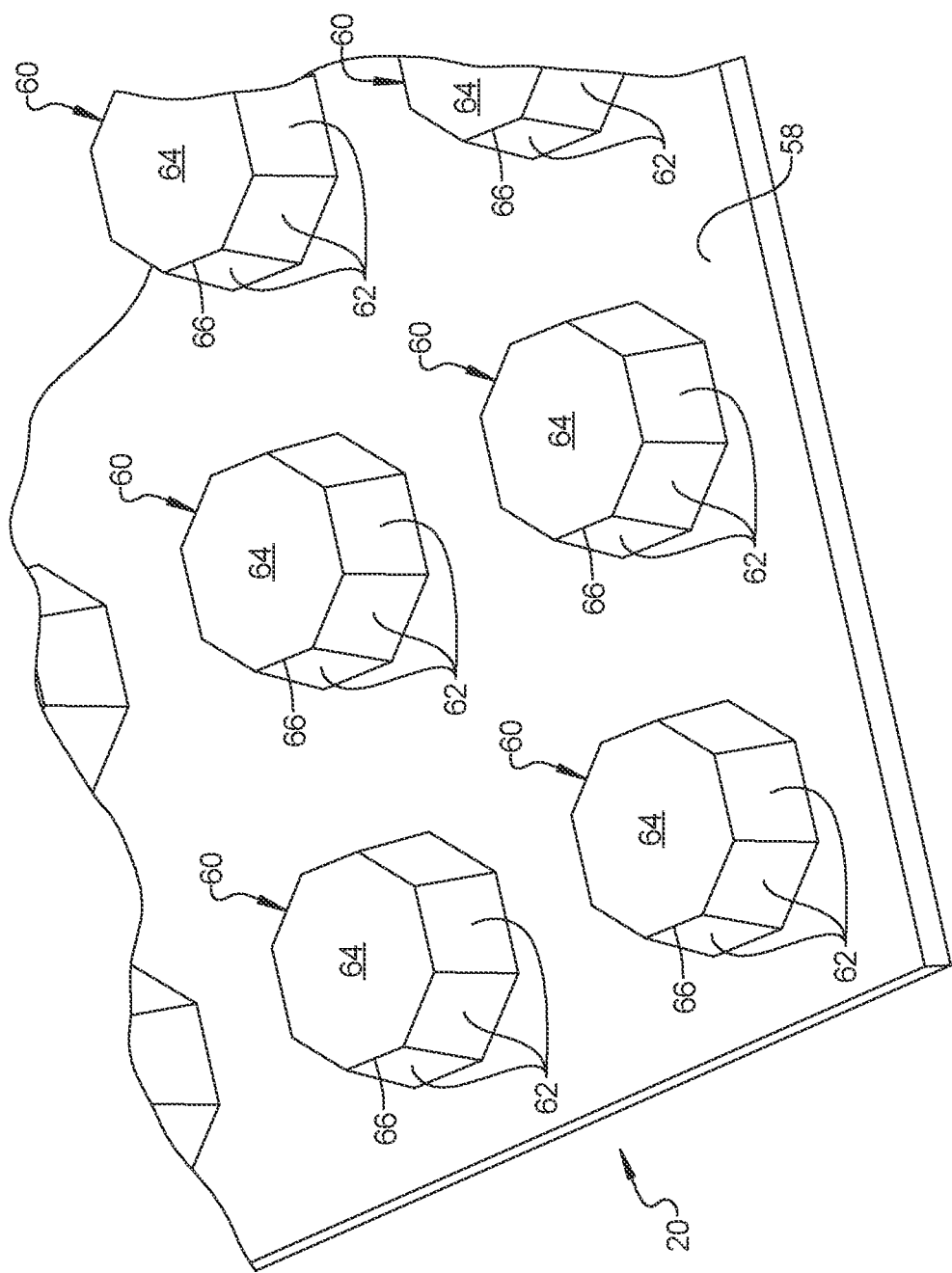
FIG. 9 is a perspective view of the cover membrane.

To install a typical floor heating system, an uncoupling membrane is secured to a subfloor using a first layer of thinset, a heating cable is embedded in the uncoupling membrane along a desired routing pattern, and a second layer of thinset is applied directly to the uncoupling membrane and the heating cable to encapsulate the heating cable. The second layer of thinset is leveled to form a flat surface, allowed to cure for 24 hours, and then floor tiles are installed on the flat surface formed by the second layer of thinset and secured to the second layer of thinset using a third layer of thinset. The third layer of thinset is allowed to cure for 24 hours, and then grout is inserted in spaces between floor tiles to form tile joints. Excess grout is then removed, and the tile floor is cleaned for use.

In contrast, a floor heating system according to the present disclosure includes a second uncoupling membrane that is used in place of the second layer of thinset to encapsulate the heating cable and to form a flat surface on which the floor tiles are installed. Thus, a floor heating system according to the present disclosure avoids the cost, time, and effort associated with applying the second layer of thinset, leveling the second layer of thinset, and allowing the second layer of thinset to cure. In addition, a floor heating system according to the present disclosure reduces the cost, time, and effort associated with repairing damage to the heating cable, as discussed in more detail below. Further, the second uncoupling membrane is significantly lighter than the second layer of thinset, and therefore the weight of a floor heating system according to the present disclosure is significantly (e.g., approximately 30%) less than the weight of a typical floor heating system. In the discussion that follows, the uncoupling membrane in which the heating cable is embedded is referred to as a base membrane, the second uncoupling membrane is referred to as a cover membrane, and the layer of thinset used to secure the floor tiles is referred to as the second layer instead of the third layer since the second layer of thinset discussed above is omitted.

The base and cover membranes uncouple the subfloor and the floor tiles from one another to allow the subfloor and the floor tiles to move relative to one another in a horizontal plane. The base and cover membranes may be used to uncouple the subfloor and the floor tiles from one another even when a heating cable is not embedded in the base membrane or encapsulated between the base and cover membranes. For example, the base and cover membranes may be included in or comprise a flooring underlayment that uncouples a subfloor and floor tiles from one another, but does not include a heating cable and is not operable to heat the floor tiles.

A flooring underlayment may include a single uncoupling membrane that uncouples the subfloor and the floor tiles from one another. To install such a flooring underlayment, the uncoupling membrane is secured to the subfloor using a first layer of thinset, and a second layer of thinset is applied directly to the uncoupling membrane. The second layer of thinset is leveled to form a flat surface, allowed to cure for 24 hours, and then floor tiles are installed on the flat surface formed by the second layer of thinset and secured to the second layer of thinset using a third layer of thinset. The third layer of thinset is allowed to cure for 24 hours, and then grout is inserted in spaces between floor tiles to form tile joints. Excess grout is then removed, and the tile floor is cleaned for use.

In contrast, a flooring underlayment according to the present disclosure includes both the uncoupling membrane that is secured to the subfloor (the base membrane) and the second uncoupling membrane (the cover membrane). The second uncoupling membrane is used in place of the second layer of thinset to form a flat surface on which the floor tiles are installed. Thus, a flooring underlayment according to the present disclosure avoids the cost, time, and effort associated with applying the second layer of thinset, leveling the second layer of thinset, and allowing the second layer of thinset to cure. In addition, a flooring underlayment according to the present disclosure reduces the cost, time, and effort associated with replacing the floor tiles since the floor tiles may be removed by breaking out only one or some of the floor tiles individually to gain access to the second uncoupling membrane, and then simply pulling up the second uncoupling membrane by hand to remove the rest of the floor tiles. Further, the second uncoupling membrane is significantly lighter than the second layer of thinset, and therefore the weight of a flooring underlayment according to the present disclosure is significantly (e.g., approximately 30%) less than a flooring underlayment that includes a single uncoupling membrane.

Referring now to FIGS. 1-3, 8, and 9, a floor heating system 10 is configured to be installed between a subfloor 12 and a plurality of floor tiles 14 and is operable to heat the floor tiles 14. The subfloor 12 may be any type of subfloor that is suitable for use with floor tile such as plywood or oriented stranded board (OSB). The floor tiles 14 may be made of ceramic, porcelain, or stone. The spaces between the floor tiles 14 are filled with grout to form joints 16 between the floor tiles 14.

The floor heating system 10 includes a base membrane 18, a cover membrane 20, and a heating cable 22. The floor heating system 10, the subfloor 12, and the floor tiles 14 may be collectively referred to as a floor structure. In various implementations, the heating cable 22 may be omitted from the floor heating system 10, in which case the floor heating system 10 may be referred to as a flooring underlayment 10, and the floor structure may be free of any heating element. A first layer 24 of thinset is applied between the subfloor 12 and the base membrane 18 to provide a level surface on which the base membrane 18 may be installed and/or to adhere the base membrane 18 to the subfloor 12. A second layer 26 of thinset is applied between the cover membrane 20 and the floor tiles 14 to provide a level surface on which the floor tiles 14 may be installed and/or to adhere the floor tiles 14 to the cover membrane 20.

The base and cover membranes 18 and 20 uncouple the subfloor 12 and the floor tiles 14 from one another to allow movement of the floor tiles 14 relative to the subfloor 12 in a horizontal plane and to allow movement of the subfloor 12 relative to the floor tiles 14 in a horizontal plane. In this regard, the base and cover membranes 18 and 20 may be referred to as uncoupling membranes. By uncoupling the subfloor 12 and the floor tiles 14 from one another and allowing such movement to occur, the base and cover membranes 18 and 20 reduce stress in the floor tiles 14 and the joints 16 therebetween, which inhibits cracking of the floor tiles 14 and the joints 16. The base and cover membranes 18 and 20 may be made (e.g., extruded) from a flexible material such as plastic (polyethylene or polypropylene) or rubber.

The base membrane 18 also creates an air space 28 between the subfloor 12 and the floor tiles 14 in which the heating cable 22 may be installed, and holds the heating cable 22 in place once the heating cable 22 is installed in the air space 28. The air space 28 may provide insulation by inhibiting heat transfer between the subfloor 12 and the floor tiles 14. The base membrane 18 includes a base layer 30 and a plurality of studs 32 that project upward from the base layer 30. The base layer 30 and the studs 32 may be formed together as a unitary body. The base layer 30 is a flat sheet of material. Each stud 32 has a right octagonal prism shape with a first end 34 attached to the base layer 30, a second, free end 36 opposite of the first end 34, and a depression or pocket 38 extending into the free end 36.

In addition, each stud 32 has outer side surfaces 40, a top surface 42, and an outer perimeter 44, and each pocket 38 has inner side surfaces 46, a bottom surface 48, and an inner perimeter 50. In the example shown, the outer perimeter 44 of each stud 32 has an octagonal shape with eight sides, and the inner perimeter 50 of each pocket 38 has an octagonal shape with eight sides. In addition, the inner side surfaces 46 of each pocket 38 taper outward at a first angle A1 from the bottom surface 48 to the top surface 42. In other examples, the outer perimeter 44 of each stud 32 and/or the inner perimeter 50 of each pocket 38 may have a polygonal shape with a number of sides other than eight, and/or the inner side surfaces 46 of each pocket 38 may not be tapered. In one example, the outer perimeter 44 of each stud 32 may have a polygonal shape with four, five, or six sides, in which the overall or three-dimensional shape of each stud 32 may be a right rectangular prism, a right pentagonal prism, or right hexagonal prism, respectively. In another example, the outer perimeter 44 of each stud 32 may have a circular shape, in which case the overall or three-dimensional shape of each stud 32 may be a right cylinder.

The heating cable 22 is operable to generate heat when electrical current is passed through the heating cable 22. The heating cable 22 is positioned between adjacent ones of the studs 32 at locations along a desired routing pattern of the heating cable 22. The desired routing pattern of the heating cable 22 may ensure that the floor tiles 14 are heated to a desired temperature within a desired response time after electrical current is first passed through the heating cable 22, while minimizing the length of the heating cable 22 that is required to do so. The heating cable 22 may be a standard heating cable such as a metal (e.g., aluminum or copper) wire housed in an outer sheath made of plastic or rubber. Alternatively, the heating cable 22 may be a fiber optic cable.

The studs 32 are arranged in a matrix on the base layer 30, and adjacent ones of the studs 32 are spaced apart from one another by a gap 52. The gap 52 has a width W1 that is approximately equal to a thickness T1 of the heating cable 22. In addition, the cross-sectional shape of the gap 52 matches the cross-sectional shape of the heating cable 22 so that the heating cable 22 is held within the gap 52 using a snug or snap fit. Further, in the example shown, the studs 32 include lips 54 that extends over the gap 52 to hold the heating cable 22 in the gap 52. The lips 54 flex to allow the heating cable 22 to be inserted into the gap 52, and then return to their original state (shown) to retain the heating cable 22 in the gap 52.

In the example shown in FIGS. 1 through 3, the heating cable 22 has a rectangular cross-section, and therefore the gaps 52 between adjacent studs 32 on the base membrane 18 have a rectangular cross section. In other implementations, the heating cable 22 may have a cross-sectional shape other than rectangular, and the gaps 52 between adjacent studs 32 on the base membrane 18 may have the same cross sectional shape. For example, as shown in FIGS. 4 and 5, the heating cable 22 may have a circular cross-sectional shape, and therefore the gaps 52 between adjacent studs 32 on the base membrane 18 also have a circular cross-section.

Referring again to FIGS. 1 through 3, 8, and 9, the cover membrane 20 is configured to be coupled to the base membrane 18 to encapsulate the heating cable 22 between the base and cover membranes 18 and 20. In addition, the cover membrane 20 is configured to form a flat top surface 56 on which the floor tiles 14 may be installed regardless of whether the heating cable 22 is included in the floor heating system 10 (or the flooring underlayment 10). Thus, the cover membrane 20 may be used in place of applying thinset directly to the base membrane 18 to encapsulate the heating cable 22 and/or to form a flat top surface on which the floor tiles 14 may be installed. Using the cover membrane 20 in place of thinset may reduce the weight of the floor heating system or flooring underlayment by a significant amount (e.g., up to approximately 30 percent). In addition, using the cover membrane 20 in place of thinset reduces the amount of time and effort required to install the floor heating system or flooring underlayment 10, as there is no need to mix thinset, apply it to the base membrane 18, and wait 24 hours for it to harden.

Further, using the cover membrane 20 in place of thinset makes it quicker, easier, and less costly to repair damage to the heating cable 22. To repair damage to the heating cable 22 in a floor heating system that uses thinset to encapsulate the heating cable 22, one must break out the floor tiles 14 and the thinset beneath the floor tiles 14, chip away the thinset encapsulating the heating cable 22 while trying not to further damage the heating cable 22, and fix the heating cable 22. Then, the base membrane 18 must be replaced, thinset must be reapplied to the base membrane 18 to encapsulate the heating cable 22, and the floor tiles 14 must be replaced. In contrast, to repair damage to the heating cable 22 in the floor heating system 10, one may simply dermal out the grout in the joints 16, pop the floor tiles 14 loose from the cover membrane 20, cut the cover membrane 20 and decouple it from the base membrane 18, fix the heating cable 22, and reinstall/reuse all parts. Thus, the floor heating system 10 avoids the need to reapply thinset to the base membrane 18 to encapsulate the heating cable 22 before proceeding with the repair, and the floor heating system 10 reduces the number of parts that must be replaced in the repair.

Moreover, regardless of whether the heating cable 22 is included in the floor heating system 10 (or the flooring underlayment 10), using the cover membrane 20 in place of thinset makes it quicker, easier, and less costly to replace the floor tiles 14. To replace the floor tiles 14 in a floor structure that uses thinset to form a flat surface on which the floor tiles 14 are installed, one must break out all the floor tiles 14 individually (or one at a time) using one or more tools (e.g., a chisel and a hammer). In contrast, to replace the floor tiles 14 in a floor structure that uses the cover membrane 20, one must only break out only one or some of the floor tiles 14 individually to gain access to the cover membrane 20, and the rest of the floor tiles 14 may be removed by simply pulling up on the cover membrane 20 by hand. When this is done, the cover membrane 20 is decoupled from the base membrane 18. The cover membrane 20 may then be separated from the floor tiles 14 and coupled to the base membrane 18, or a new cover membrane 20 may be coupled to the base membrane 18, before installing a new second layer 26 of thinset and new floor tiles 14.

The cover membrane 20 includes a cover layer 58 and a plurality of studs 60 that project downward from the cover layer 58. The cover layer 58 and the studs 60 may be formed together as a unitary body. The cover layer 58 is a flat sheet of material. The studs 60 on the cover membrane 20 are configured to fit within the pockets 38 in the studs 32 on the base membrane 18 to couple the cover membrane 20 to the base membrane 18.

The overall or three-dimensional shape of each stud 60 on the cover membrane 20 may match the overall or three-dimensional shape of each pocket 38 in the base membrane 18. In addition, the dimensions of each stud 60 on the cover membrane 20 may be equal to, or slightly greater than, the dimensions of each pocket 38 in the base membrane 18 to yield a snug or snap fit between the studs 60 and the pockets 38. The studs 60 are arranged in a matrix on the cover layer 58 and are spaced apart from one another in a horizontal plane to enable a plurality (e.g., all) of the studs 60 to be positioned within corresponding ones of the pockets 38 in the base membrane 18 at the same time.

In the example shown, each stud 60 has a right octagonal prism shape. In addition, each stud 60 has outer side surfaces 62, a bottom surface 64, and an outer perimeter 66. In the example shown, the outer perimeter 66 of each stud 60 has an octagonal shape with eight sides, and the outer side surfaces 62 of each stud 60 taper inward at a second angle A2 from the cover layer 58 to the bottom surface 64. In other examples, the outer perimeter 66 of each stud 60 may have a polygonal shape with a number of sides other than eight, and/or the outer side surfaces 62 of each stud 60 may not be tapered. In one example, the outer perimeter 66 of each stud 60 may have a polygonal shape with four, five, or six sides, in which the overall or three-dimensional shape of each stud 60 may be a right rectangular prism, a right pentagonal prism, or right hexagonal prism, respectively. In another example, the outer perimeter 66 of each stud 60 may have a circular shape, in which case the overall or three-dimensional shape of each stud 60 may be a right cylinder.

The outer side surfaces 62 of each stud 60 on the cover membrane 20 may match the inner side surfaces 46 of each pocket 38 in the base membrane 18. For example, the second angle A2 at which the outer side surfaces 62 of each stud 60 taper inward may be equal to the first angle A1 at which the inner side surfaces 46 of each pocket 38 taper outward. In addition, the outer perimeter 66 of each stud 60 on the cover membrane 20 may match the inner perimeter 50 of each pocket 38 in the base membrane 18. For example, the outer perimeter 66 of each stud 60 on the cover membrane 20 may have the same shape and the same number of sides as the inner perimeter 50 of each pocket 38 in the base membrane 18.

In addition to or instead of sizing and shaping the pockets 38 in the base membrane 18 and the studs 60 on the cover membrane 20 to yield a snug or snap fit therebetween, a detent mechanism may be used to retain the studs 60 in the pockets 38. For example, as shown in FIGS. 4 and 5, the base membrane 18 may define a groove 68 that extends around the inner perimeter 50 of each pocket 38 near the bottom surface 48 thereof, and each stud 60 may include a lip 70 that extends around the outer perimeter 66 of each stud 60 near the bottom surface 64 thereof. The lips 70 on the studs 60 of the cover membrane 20 may engage the grooves 68 in the pockets 38 of the base membrane 18 to couple the cover membrane 20 to the base membrane 18 using a snap fit.

Figure 10:
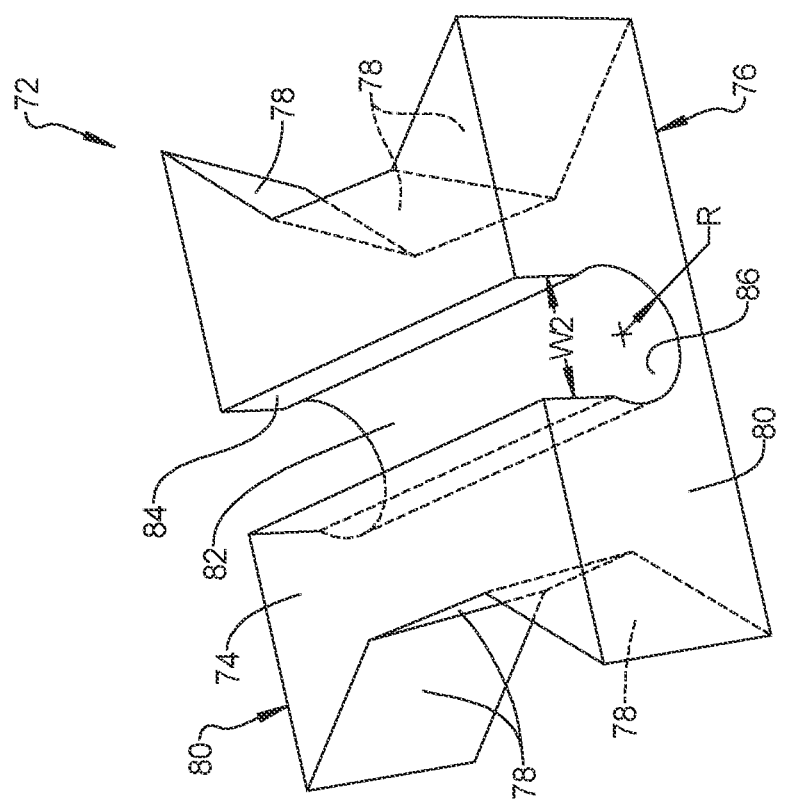
FIG. 10 is a perspective view of the conversion clip.

Referring now to FIGS. 6, 7, and 10, the cover membrane 20 may be fitted with a conversion clip 72 to convert the cover membrane 20 into a base membrane when, for example, it is not desirable to encapsulate the heating cable 22 using the cover membrane 20. Assuming that the area of the cover membrane 20 is equal to the area of the base membrane 18, converting the cover membrane 20 into a base membrane and placing the cover membrane 20 alongside the base membrane 18 doubles the area of the uncoupling membrane. The conversion clip 72 is configured to be positioned between adjacent ones of the studs 60 on the cover membrane 20 to hold the heating cable 22 in place. Although FIG. 6 only shows one of the conversion clip 72, the conversion clip 72 may be installed at multiple locations along a desired routing pattern of the heating cable 22 through the cover membrane 20.

The conversion clip 72 has a top surface 74, a bottom surface 76, opposite side surfaces 78, opposite end surfaces 80, and a channel 82 that extends into the top surface 74 and through the end surfaces 80. The side surfaces 78 are configured to conform to the outer side surfaces 40 of adjacent ones of the studs 60 on the cover membrane 20. The channel 82 is configured to conform to the heating cable 22.

In the example shown on the right in FIGS. 6 and 7 and shown in FIG. 10, the channel 82 includes a first portion 84 having a rectangular cross-section and a second portion 86 having a circular cross-section. The first portion 84 of the channel 82 has a width W2 that is slightly less than a diameter D1 of the heating cable 22. The second portion 86 of the channel 82 has a radius R that is approximately equal to one-half of the diameter D1 of the heating cable 22. Thus, the heating cable 22 may be compressed as the heating cable 22 is inserted through the first portion 84 of the channel 82, and then the heating cable 22 may return to its original, uncompressed state once the heating cable 22 is in the second portion 86 of the channel 82. In this manner, the conversion clip 72 may retain the heating cable 22 using a snap fit.

In the example shown on the left in FIG. 7, the heating cable 22 has a diameter D2 that is greater than the diameter D1, and the entire channel 82 has a rectangular cross-section with a width W3 that is equal to or slightly less than the diameter D2. Thus, the heating cable 22 may be compressed as the heating cable 22 is inserted into the channel 82, and the heating cable 22 may remain compressed until the heating cable 22 is withdrawn from the channel 82. In this manner, the conversion clip 72 may retain the heating cable 22 using a snug fit.

Figure 11:
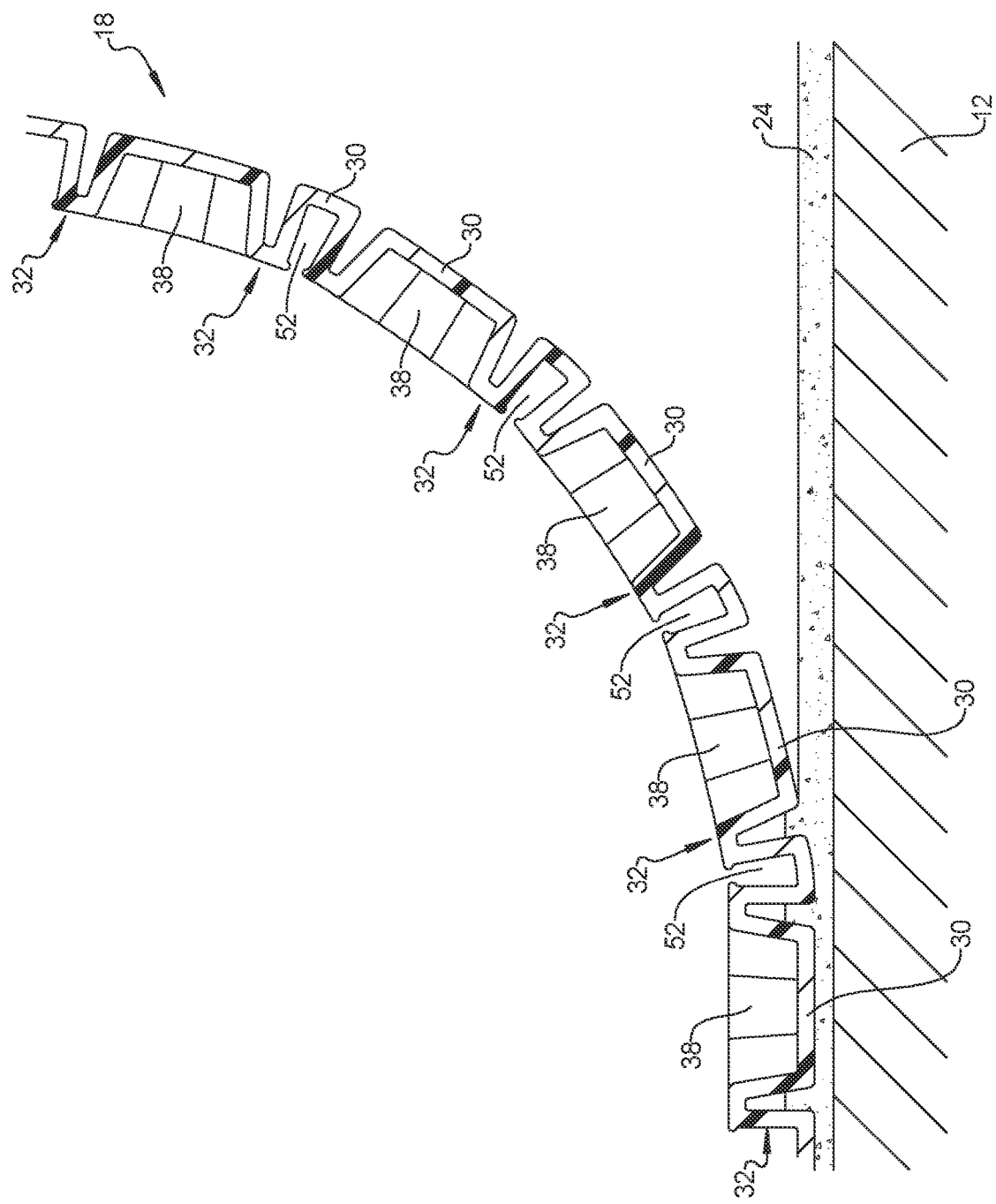
FIG. 11 is a section view illustrating the base membrane being applied to a subfloor using thinset.
Figure 12:
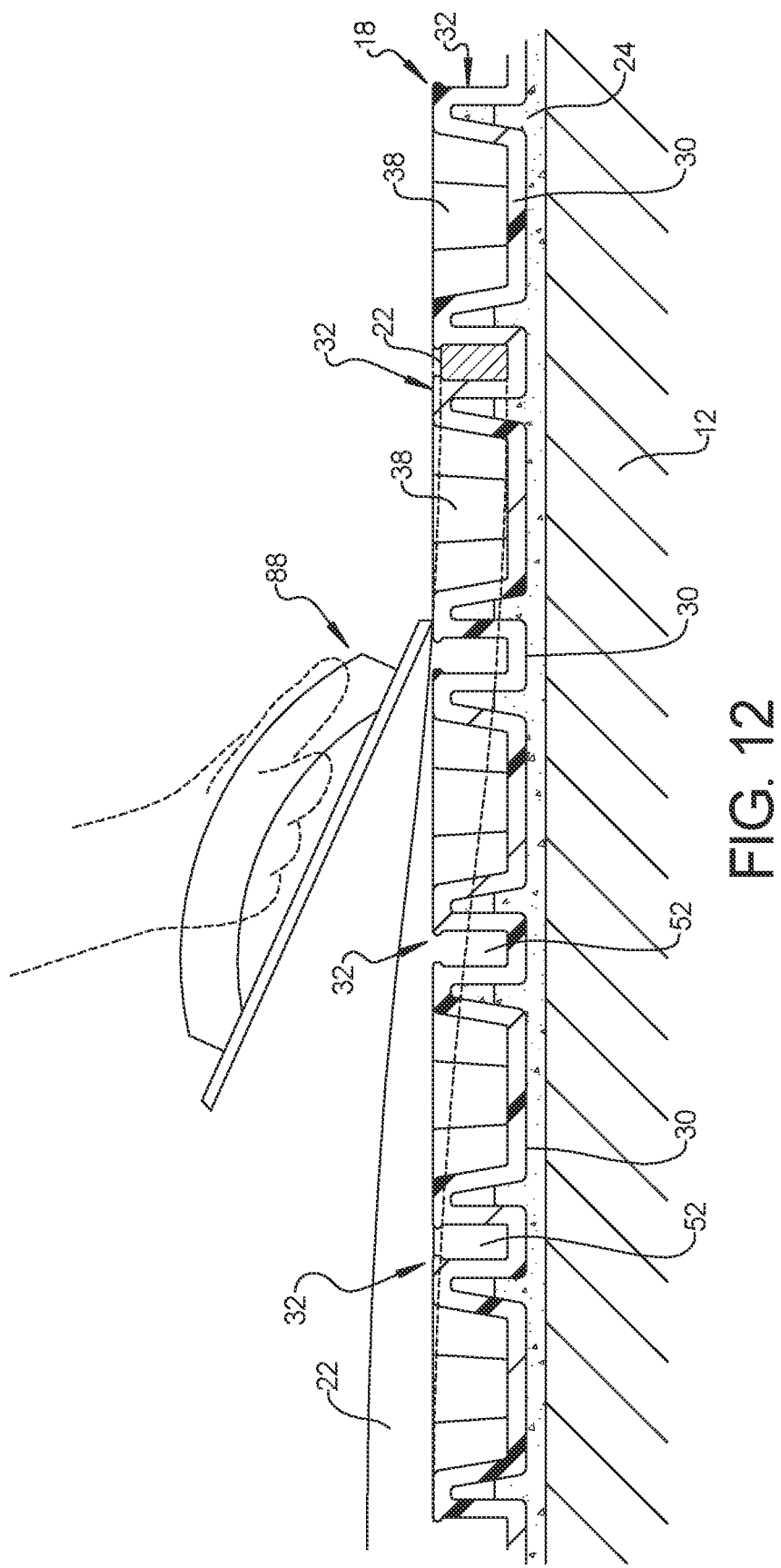
FIG. 12 is a section view illustrating the heating cable being embedded between suds on the base membrane at locations along a desired routing pattern.

Referring now to FIGS. 11 through 14, a method of installing the floor heating system 10 (or the flooring underlayment 10) will now be described. First, the first layer 24 of thinset is applied to the subfloor 12, and the base membrane 18 is placed onto the subfloor 12 over the first layer 24 of thinset as shown in FIG. 11. Instead of or in addition to using thinset, the base membrane 18 may be secured to the subfloor using fasteners (e.g., screws) and/or adhesive (e.g., peel-and-stick adhesive). Then, if the floor heating system 10 includes the heating cable 22, the heating cable 22 is positioned at locations between the studs 32 on the base membrane 18 along a desired routing pattern of the heating cable 22 as shown in FIG. 12. The heating cable 22 may be embedded between the studs 32 on the base membrane 18 using a trowel 88.

Figure 13:
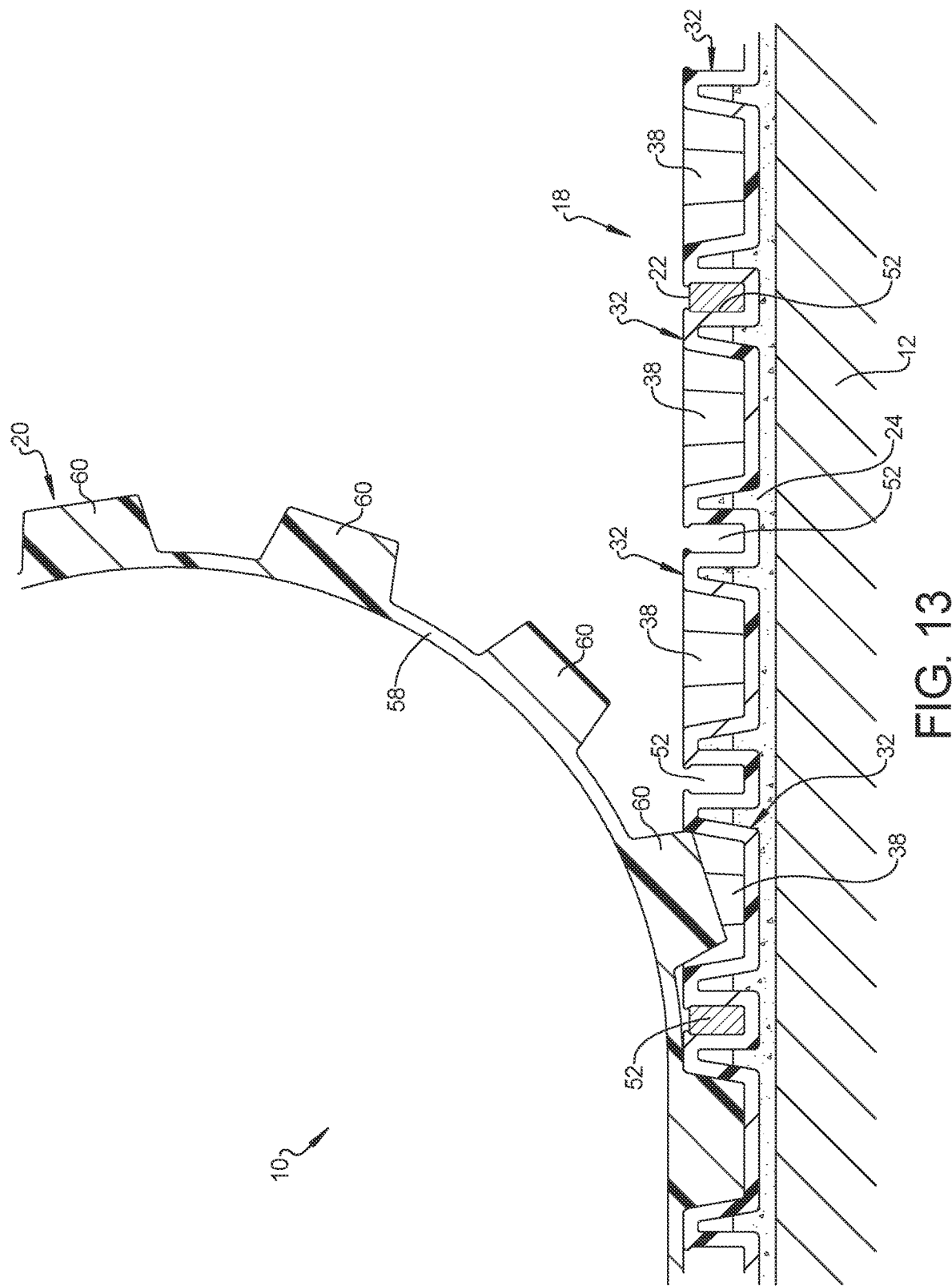
FIG. 13 is a section view illustrating the cover membrane being assembled to the base membrane to encapsulate the heating cable and to form a flat top surface.
Figure 14:
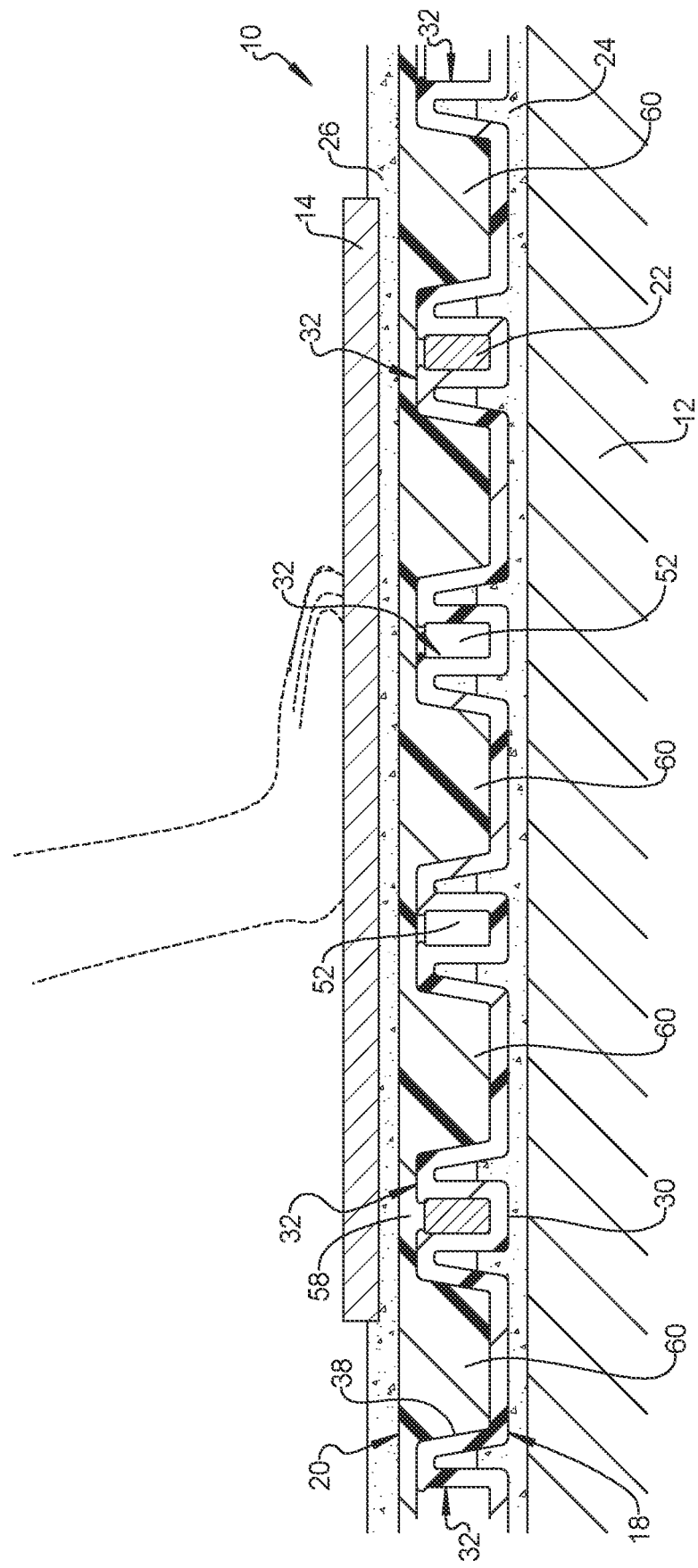
FIG. 14 is a section view illustrating the use of thinset to install tile onto the flat top surface formed by the cover membrane.

Then, the cover membrane 20 is coupled to the base membrane 18 by inserting the studs 60 on the cover membrane 20 into the pockets 38 in the base membrane 18 as shown in FIG. 13. In turn, the cover membrane 20 forms the flat top surface 56 on which the floor tiles 14 are installed, and the heating cable 22 (if included) is encapsulated between the base and cover membranes 18 and 20. The studs 60 may be secured within the pockets 38 using a snap fit as discussed above. Finally, the second layer 26 of thinset is applied to the flat top surface 56 formed by the cover membrane 20, and the floor tiles 14 are installed on the flat top surface 56 over the second layer 26 of thinset as shown in FIG. 14. Since the cover membrane 20 is used in place of thinset to encapsulate the heating cable 22 and/or to form the flat top surface 56, the floor tiles 14 are installed without applying thinset directly to the top surface of the base membrane 18.

The second layer 26 of thinset may be troweled (i.e., leveled using the trowel 88) before the floor tiles 14 are placed on the second layer 26 of thinset. The second layer 26 of thinset may be allowed to cure (i.e., harden) for 24 hours after the floor tiles 14 are placed on the second layer 26 of thinset. Once the second layer 26 of thinset is cured, the spaces between the floor tiles 14 may be filled with grout to form the joints 16 between the floor tiles 14. Then, a final clean may be performed to remove excess material (e.g., excess grout) on the tile floor.

Referring now to FIGS. 15 through 18, a universal membrane 90 may be divided (e.g., cut) along a dividing line 92 into a first portion or base membrane 94 and a second portion or cover membrane 96. The cover membrane 96 may then be flipped over and coupled to the base membrane 94 so that the base and cover membranes 94 and 96 collectively form an uncoupling membrane that allows a subfloor and floor tiles to move relative to one another in a horizontal plane. In addition, the heating cable 22 may be placed onto the base membrane 94 so that when the cover membrane 96 is coupled to the base membrane 94, the base and cover membranes 94 and 96 encapsulate the heating cable 22.

Alternatively, the base and cover membranes 94 and 96 may be coupled to one another to form an uncoupling membrane without inserting the heating cable 22 therebetween. In addition, a single portion of the universal membrane 90 may be used as an uncoupling membrane and/or used to position the heating cable 22 without coupling another portion of the universal membrane 90 thereto. The universal membrane 90 may be made (e.g., extruded) from a flexible material such as plastic (polyethylene or polypropylene) or rubber. The Although FIG. 15 only shows the first portion 94 of the universal membrane 90 on one side of the dividing line 92, it should be understood that the second portion 96 of the universal membrane 90 may be similar or identical to the first portion 94 thereof. In addition, while the dividing line 92 is a curved or wavy line in the example shown, the dividing line 92 may be a straight line. Furthermore, the universal membrane 90 may have a reduced thickness, perforations, and/or markings (e.g., a dashed line) along the dividing line 92 to facilitate dividing the universal membrane 90. Moreover, multiple dividing lines 92 may be disposed at regular intervals across the width and/or length of the universal membrane 90.

Each of the base and cover membranes 94 and 96 includes a cover or base layer 98, studs 100 projecting from the base layer 98, and protrusions or sidewalls 102 projecting from the base layer 98. Each sidewall 102 forms a perimeter of a pocket 104, and the base layer 98 forms a bottom wall 106 of the pocket 104. While the perimeter formed by each sidewall 102 is in the shape of a pentagon in the example shown, the perimeter formed by each sidewall 102 may have other shapes such as an octagon or a circle. In addition, the base and cover membranes 94 and 96 may include a greater or lesser number of the studs 100 and/or the sidewalls 102 than shown. Each of the base and cover membranes 94 and 96 has a thickness T2, which may be within a range of 1 millimeters (mm) to 3 mm. When the cover membrane 96 is coupled to the base membrane 94 to form an uncoupling membrane as shown in FIG. 18, the uncoupling membrane has a thickness T3, which may be within a range of 6 mm to 10 mm.

Each stud 100 on the base membrane 94 fits within one of the pockets 104 of the cover membrane 96, and each stud 100 on the cover membrane 96 fits within one of the pockets 104 of the base membrane 94. The perimeter of each stud 100 on the base and cover membranes 94 and 96 may have the same shape as the perimeter of each pocket 104 of the base and cover membranes 94 and 96. In addition, the size of each pocket 104 of the base and cover membranes 94 and 96 may be slightly greater or less than the size of each stud 100 on the base and cover membranes 94 and 96 to yield a transition fit therebetween. For example, each stud 100 on the base and cover membranes 94 and 96 may have a width W1 of approximately 12 mm, and each pocket 104 on the base and cover membranes 94 and 96 may have a width W2 that is slightly greater than the width W1. In another example, each stud 100 on the base and cover membranes 94 and 96 may have height H1 of approximately 5.5 mm, and each sidewall 102 on the base and cover membranes 94 and 96 may have a height H2 that is slightly less than the height H1. A distance D between the studs 100 and the sidewalls 102 may be equal to the height H1 and/or may be large enough to enable inserting the heating cable 22 therebetween. For example, the distance D between the studs 100 and the sidewalls 102 may be greater than the thickness T1 of the heating cable 22.

Figure 15:
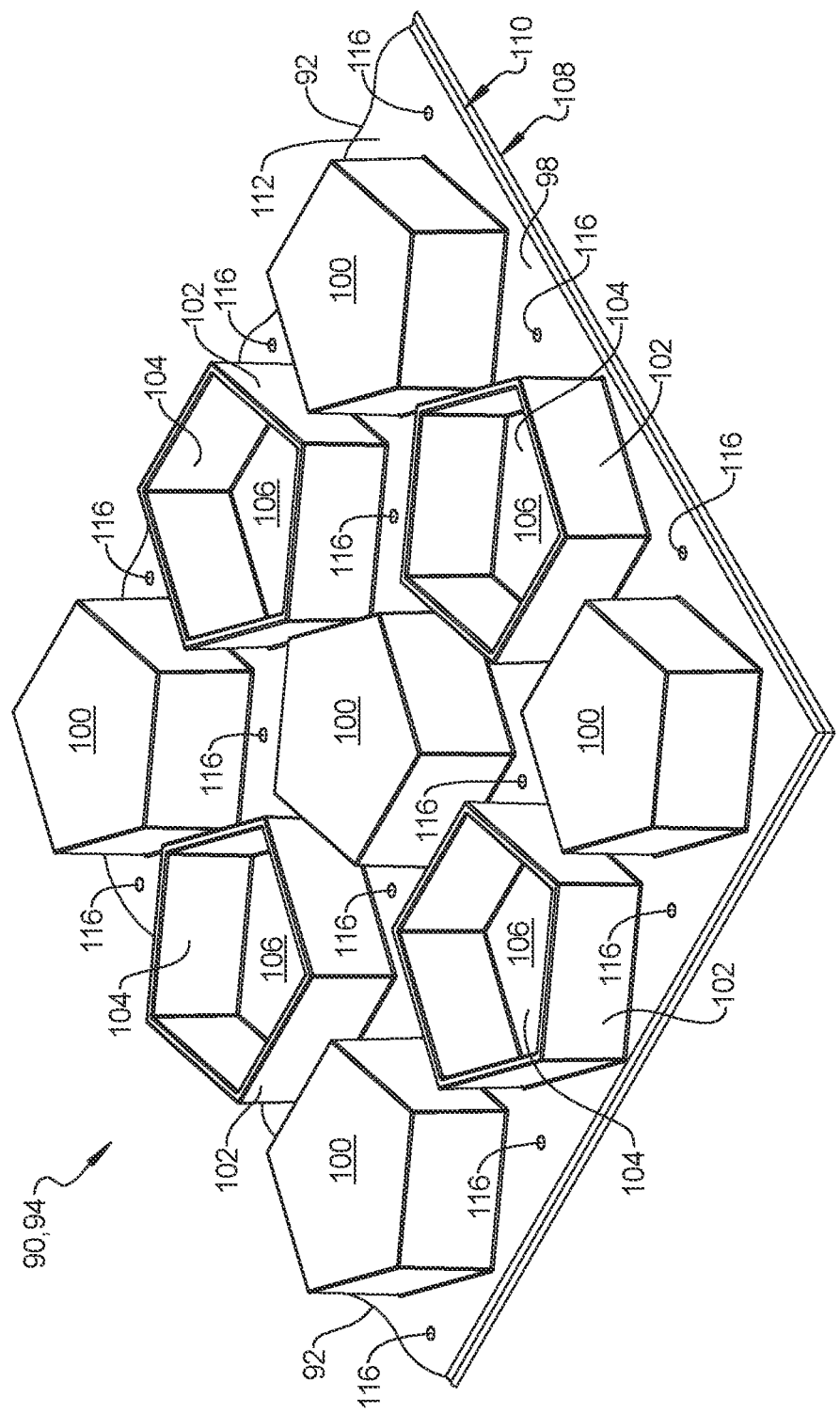
FIG. 15 is a top perspective view of a universal membrane according to the principles of the present disclosure.
Figure 16:
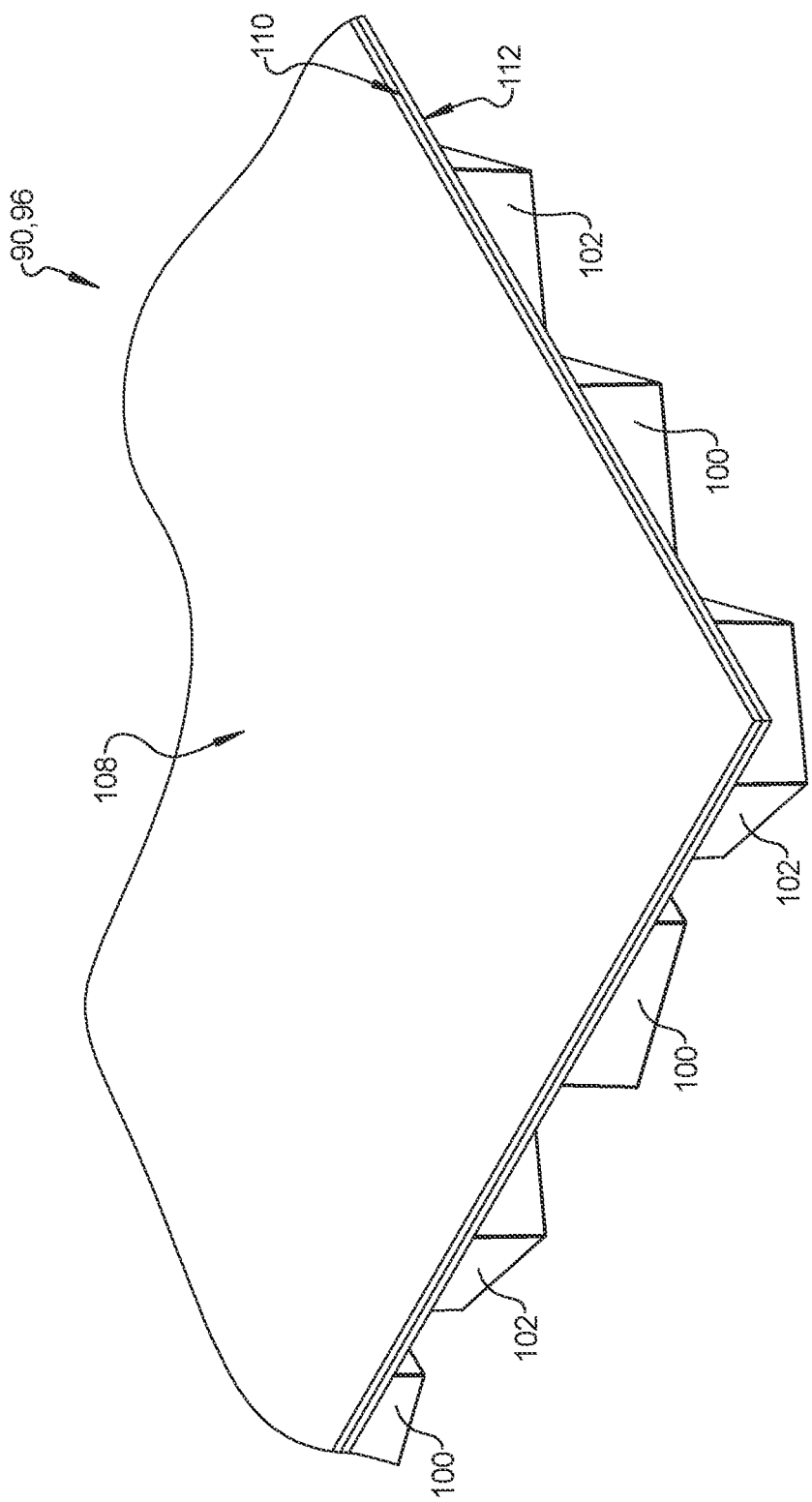
FIG. 16 is a bottom perspective view of the universal membrane of FIG. 15.

As best shown in FIG. 15, the studs 100 are aligned in a first set of rows extending diagonally across the universal membrane 90, and the sidewalls 102 are aligned in a second set of rows extending diagonally across the universal membrane 90. The first and second sets of rows are arranged in an alternating pattern with rows of the first set disposed between rows of the second set, and rows of the second set disposed between rows of the first set. In various implementations, the first and second rows may extend parallel to edges of the universal membrane 90, or the studs 100 and the sidewalls 102 may not be aligned in rows.

In the example shown, a nonwoven fabric layer 108 is attached to a back side 110 of the base layer 98 opposite of a front side 112 of the base layer 98 from which the studs 100 and the sidewalls 102 project. The nonwoven fabric layer 108 reduces sound transmission through the floor structure and prevents tile adhesive (e.g., thinset) from entering an interior cavity 114 (FIGS. 17 and 18) of the studs 100. In various implementations, the nonwoven fabric layer 108 may be omitted.

The base and cover membranes 94 and 96 may be used in place of the base and cover membranes 18 and 20, respectively, in the floor heating system 10 (or flooring underlayment 10) of FIGS. 1, 2, 3, 13, and 14. If this substitution is made, the method of installing the floor heating system 10 (or flooring underlayment 10) is substantially the same as that described above with a few exceptions. First, the heating cable 22 is positioned between the studs 100 on the base membrane 94 and the sidewalls 102 on the base membrane 94 as shown in FIG. 17 instead of between adjacent ones of the studs 32 on the base membrane 18 as shown in FIG. 12. Alternatively, the floor structure may be free of any heating element.

Second, the cover membrane 96 is coupled to the base membrane 94 by both inserting the studs 100 on the cover membrane 96 into the pockets 104 in the base membrane 94 and inserting the studs 100 on the base membrane 94 into the pockets 104 in the cover membrane 96 as shown in FIG. 18. This contrasts with merely inserting the studs 60 on the cover membrane 20 into the pockets 38 in the base membrane 18 as described above with reference to FIG. 13. When the studs 100 on the base and cover membranes 94 and 96 are inserted into the pockets 104 in the other one of the base and cover membranes 94 and 96, the heating cable 22 is held between the sidewalls 102 on the base membrane 94 and adjacent ones of the sidewalls 102 on the cover membrane 96.

In any of the examples described above, the membranes may be impermeable to tile adhesive. Thus, in the floor heating system 10 (or flooring underlayment 10) of FIGS. 1, 2, 3, 13, and 14, the cover membrane 20 may prevent the second layer 26 of thinset from reaching the base membrane 18. Similarly, if the floor heating system 10 (or flooring underlayment 10) includes the base and cover membranes 94 and 96 in place of the base and cover membranes 18 and 20, respectively, the cover membrane 96 may prevent the second layer 26 of thinset from reaching the base membrane 94.

Additionally or alternatively, in any of the examples described above, the membranes may be permeable to allow moisture (e.g., water) to pass therethrough. For example, perforations 116 may be formed in the base layers 98 of the base and cover membranes 94 and 96. The perforations 116 may be sized to allow moisture to pass therethrough while preventing tile adhesive from passing therethrough.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe spatial and functional relationships between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A floor structure comprising:
a universal membrane configured to be installed between a subfloor and floor tiles to allow movement of the floor tiles relative to the subfloor, the universal membrane comprising:
a base layer forming a planar surface;
a plurality of studs projecting from the base layer; and
a plurality of sidewalls projecting from the base layer and disposed between adjacent ones of the plurality of studs, each sidewall of the plurality of sidewalls forming a perimeter of a pocket, the base layer forming a bottom wall of the pocket, wherein:
a first portion of the universal membrane is configured to be separated from a second portion of the universal membrane;
the first and second portions of the universal membrane are configured to be coupled to one another by inserting the plurality of studs on one of the first and second portions of the universal membrane into the pockets formed by the plurality of sidewalls on the other one of the first and second portions of the universal membrane;
the first portion of the universal membrane forms a base membrane configured to be placed on the subfloor; and
the second portion of the universal membrane forms a cover membrane configured to cover the base membrane and to support the floor tiles.

2. The floor structure of claim 1 wherein each stud of the plurality of studs is configured to be secure within the pocket defined by one of the plurality of sidewalls and the base layer using a transition fit.

3. The floor structure of claim 1 wherein each stud of the plurality of studs has a perimeter with the same shape as the perimeter formed by each sidewall of the plurality of sidewalls.

4. The floor structure of claim 1 wherein the perimeter formed by each sidewall of the plurality of sidewalls is in the shape of a pentagon.

5. The floor structure of claim 1 wherein the plurality of studs are aligned in a first set of rows, the plurality of sidewalls are arranged in a second set of rows, and the first and second sets of rows are arranged in an alternating pattern with rows of the first set disposed between rows of the second set, and rows of the second set disposed between rows of the first set.

6. The floor structure of claim 1 wherein the base layer is configured to be cut to separate the first portion of the universal membrane from the second portion of the universal membrane.

7. The floor structure of claim 1 wherein one of the plurality of sidewalls on the first portion of the universal membrane and one of the plurality of sidewalls on the second portion of the universal membrane are configured to hold a heating cable therebetween.

8. The floor structure of claim 1 further comprising:
the subfloor; and
the floor tiles.

9. A floor structure comprising:
a subfloor;
floor tiles;
a base membrane configured to be placed onto the subfloor, the base membrane including a base layer forming a planar surface; and
a cover membrane configured to be directly coupled to the base membrane to form a support surface for supporting the floor tiles, the base and cover membranes collectively forming an uncoupling membrane configured to allow movement of the floor tiles relative to the subfloor,
wherein:
the floor structure is free of any heating element;

the base membrane further includes a plurality of protrusions projecting from the base layer and defining a plurality of pockets therein;

the cover membrane includes a cover layer and a plurality of studs projecting from the cover layer, the plurality of studs on the cover membrane configured to fit within the plurality of pockets in the base membrane to couple the cover membrane to the base membrane;

the base membrane further includes a plurality of studs projecting from the base layer; and the cover membrane further includes a plurality of protrusions projecting from the cover layer and defining a plurality of pockets therein, the plurality of studs on the base membrane configured to fit within the plurality of pockets in the cover membrane to couple the cover membrane to the base membrane.

10. The floor structure of claim 9 wherein:

the plurality of protrusions of the base membrane form sidewalls of the plurality of pockets; and the base layer of the base membrane forms bottom walls of the plurality of pockets.

11. The floor structure of claim 9 wherein the base and cover membranes are made of a material having the flexibility of rubber.

12. A method of installing a floor structure, the method comprising:

separating a universal membrane into a base membrane and a cover membrane, each of the base and cover membranes including a base layer, the base layer forming a planar surface, a plurality of studs projecting from the base layer, and a plurality of sidewalls projecting from the base layer and disposed between adjacent ones of the plurality of studs, the plurality of sidewalls defining a plurality of pockets with each sidewall of the plurality of sidewalls forming a perimeter of one of the plurality of pockets;

placing the base membrane onto a subfloor;

coupling the cover membrane to the base membrane by inserting the plurality of studs on the cover membrane into the plurality of pockets in the base membrane and inserting the plurality of studs on the base membrane into the plurality of pockets in the cover membrane; and installing floor tiles on the cover membrane.

13. The method of claim 12 wherein separating the universal membrane into the base and cover membranes includes cutting the universal membrane.

14. The method of claim 12 further comprising positioning a heating cable between one sidewall of the plurality of sidewalls on the base membrane and one sidewall of the plurality of sidewalls on the cover membrane such that the heating cable is held between the two sidewalls.

15. The method of claim 14 wherein positioning the heating cable between the two sidewalls includes:

placing the heating cable onto the base layer of the base membrane between the one sidewall of the base membrane and one of the plurality of studs on the base membrane adjacent to the one sidewall of the base membrane; and placing the cover membrane onto the base membrane such that the pocket defined by the one sidewall of the cover membrane receives the adjacent stud on the base membrane.

16. The method of claim 12 further comprising:

applying a first layer of tile adhesive between the subfloor and the base membrane; and applying a second layer of tile adhesive between the cover membrane and the floor tiles.

17. A method of replacing the floor tiles after installing the floor structure according to the method of claim 15, the method of replacing the floor tiles comprising:

pulling up on the cover membrane by hand to remove the cover membrane and the floor tiles;

reinstalling the cover membrane or installing a new one of the cover membrane; and installing new ones of the floor tiles.

* * * * *